United States Patent

Maurstad et al.

[11] Patent Number: 5,129,471
[45] Date of Patent: Jul. 14, 1992

[54] EARTH BORING BIT WITH PROTECTED SEAL MEANS

[75] Inventors: Cary A. Maurstad, Kingwood; James R. Hall, Huffman, both of Tex.

[73] Assignee: Hughes Tool Company, Houston, Tex.

[21] Appl. No.: 708,854

[22] Filed: May 31, 1991

[51] Int. Cl.$^5$ .................. E21B 10/22; F16C 33/76; F16J 15/50
[52] U.S. Cl. .................. 175/228; 175/371; 175/372; 384/94
[58] Field of Search .......... 175/228, 371, 372; 384/94; 277/83, 84, 95, 96.1

[56] References Cited

U.S. PATENT DOCUMENTS

| | | | |
|---|---|---|---|
| 3,397,928 | 8/1968 | Galle | 277/81 |
| 3,449,024 | 6/1969 | Lichte | 175/371 X |
| 3,765,495 | 10/1973 | Murdoch et al. | 175/371 |
| 4,014,595 | 3/1977 | Dolezal | 384/93 |
| 4,209,890 | 7/1980 | Koskie, Jr. | 175/371 X |
| 4,372,624 | 2/1983 | Neilson | 384/94 |
| 4,516,641 | 5/1985 | Burr | 175/228 |
| 4,554,985 | 11/1985 | Backlund | 75/371 |
| 4,623,028 | 11/1986 | Murdoch et al. | 175/371 |
| 4,727,942 | 3/1988 | Galle et al. | 175/228 |
| 4,753,304 | 6/1988 | Kelly, Jr. | 175/371 |

*Primary Examiner*—Stephen J. Novosad
*Attorney, Agent, or Firm*—Robert A. Felsman

[57] ABSTRACT

An earth boring bit having a body, pressure compensating lubricating system and cantilevered bearing shaft with an annular seal surface and a radial seal surface. A cutter is rotatably secured to the bearing shaft, with an annular seal recess having radial and cylindrical seal surfaces to oppose the seal surfaces on the body and bearing shaft to define a seal gland. A resilient and annular packing ring is compressed between the cylindrical seal surfaces, but has a length less than the minimum length of the gland. A shroud extends inwardly near the outer backface a selected distance behind the packing ring to bias it inwardly. The shroud extends inwardly toward the bearing not more than about 30% of the cross-sectional thickness of the O-ring in the relaxed condition. The O-ring is compressed in a range of about 10 to 15 percent.

7 Claims, 1 Drawing Sheet

EARTH BORING BIT WITH PROTECTED SEAL MEANS

BACKGROUND OF THE INVENTION

1. Field of the Invention:

This invention relates in general to earth boring bits, particularly to those having rotatable cutters in which packing ring seals retain lubricant within the bearing areas.

2. Background Information:

One of the most successful seal means used in earth boring bits of the type having rotatable cutters is the O-ring seal. It successfully confines lubricant to the bearing area while excluding detritus for long periods of time before failure.

There are two general categories of O-ring seals utilized in earth boring bits: (1) those permitting axial motion or play of the O-ring; and (2) those utilizing a recess to retain the seal in one position relative to either the cutter or bearing shaft, usually the cutter.

Examples of those earth boring bits with seals permitting axial motion relative to the bearing shaft or cutter are U.S. Pat. Nos. 3,397,928; 4,014,595 and 4,516,641.

Examples of those seals which are confined in one position relative to the cutter are U.S. Pat. Nos. 3,765,495; 4,372,624; and 4,554,985.

The primary advantage of those O-ring seals permitting axial motion is the minimization of pressure pulses in the lubricant. Pressure pulses adjacent the seal can be detrimental and can result in leakage of lubricant or damage to the seal unless there is sufficient play of the seal in the recess to avoid extrusion. A sufficient amount of play reduces the magnitude of the pressure pulses to prevent extrusion of the O-ring from the seal recess (commonly called the "gland").

The advantages of those seals systems in which the seal is confined in one position, usually in the cutter, are: (1) protecting the seal from abrasives that cause wear and deterioration, 2) biasing the seal to keep the seal with the cutter to minimize pressure pulses and (3) preventing the pressure pulses in the lubricant from pushing the O-ring with excessive force against a stationary seal surface on the body of the bit.

SUMMARY OF THE INVENTION

An improved earth boring bit having a body, pressure compensating lubrication system and cantilevered bearing shaft with a cylindrical seal surface and a radial seal surface. A cutter is rotatably secured to the bearing shaft, with an annular seal recess having radial and cylindrical seal surfaces to oppose the seal surfaces on the body and bearing shaft. A resilient and annular packing ring is compressed between the cylindrical seal surfaces but has a clearance from the radial seal surfaces to permit pressure compensating movement of the seal in the recess. A shroud extends inwardly at the outer end of the annular seal recess to bias the packing ring inwardly to protect the ring. The seal recess has a length about 30 percent greater than the relaxed thickness of the O-ring.

Additional features, objects and advantages of the invention will be come apparent with the following description.

DESCRIPTION OF THE PREFERRED EMBODIMENT

Figure 1:
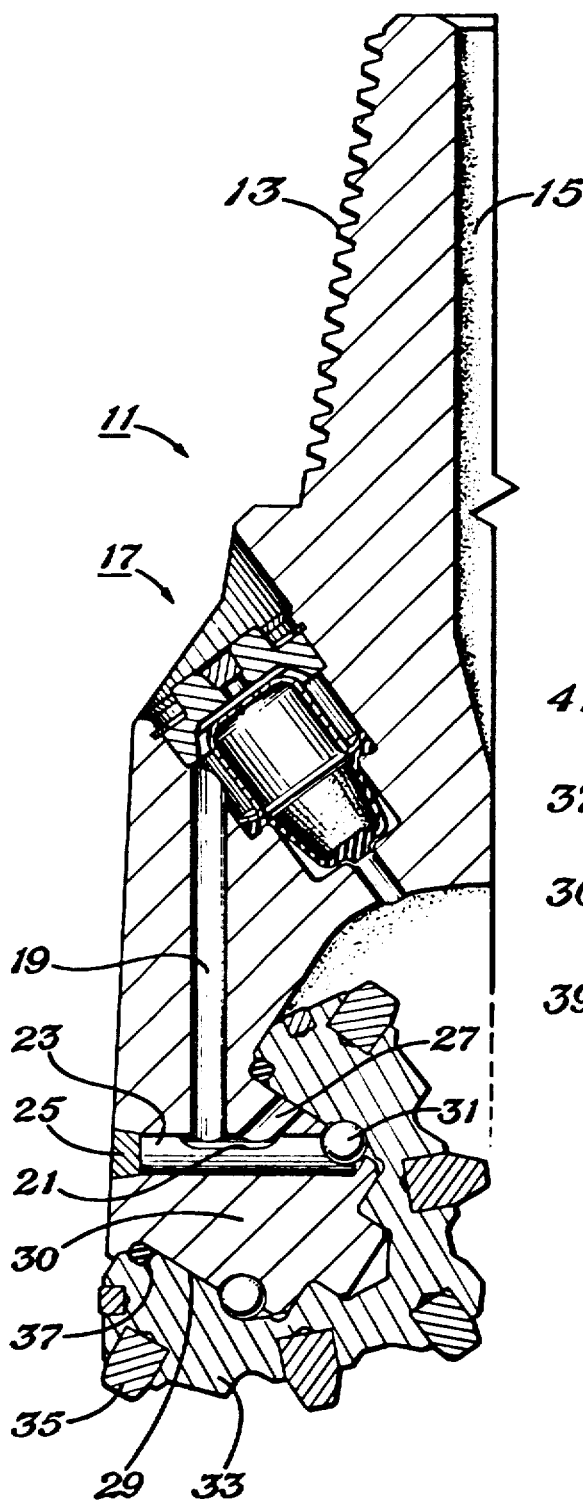
FIG. 1 is a longitudinal section of one leg of an earth boring bit that embodies the features of the invention.

The numeral 11 in FIG. of the drawing designates an earth boring bit having a threaded upper portion 13 for connection to a drill string member (not shown). A fluid passage 15 directs drilling fluid to a nozzle (not shown) that impinges drilling fluid against the borehole bottom to flush cuttings to the surface of the earth.

A pressure compensating system 17 is contained within each section of the body, there usually being three which are welded to form the composite body. The lubrication system is preferably similar to that shown in U.S. Pat. No. 4,727,942.

In each section of the body is a lubrication passage 19 that extends downwardly into intersection with another lubrication passage 21 in the upper portion of a ball plug 23 which is secured to the body by a plug weld 25. A third lubrication passage 27 carries lubricant to a cylindrical bearing surface 29 on a bearing shaft 30 which is cantilevered downwardly and inwardly from an outer and lower region of the body of the bit.

The ball plug 23 retains a series of ball bearings 31 that rotatably secure the cutter 33 to the bearing shaft 30. Dispersed in the cutter are a plurality of rows of earth disintegrating teeth 35 that are constructed of a sintered tungsten carbide secured by interference fit into mating holes in the cutter 33.

Figure 3:
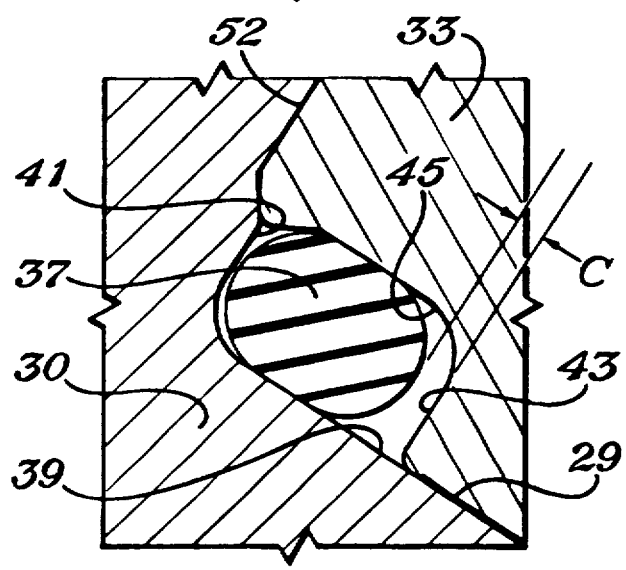
FIG. 3 is a fragmentary, longitudinal cross-section showing an enlarged view of the seal means and recess configuration of FIG. 1.

As shown in FIG. 3, a cylindrical seal surface 39 is formed near the base of the bearing shaft 30 to adjoin a radial seal surface 41, these surfaces being joined by a suitable radius. The seal surfaces 39, 41 are opposed by a radial seal surface 43 in the cutter 33, which also contain a cylindrical seal surface 45, these surfaces being joined by a suitable radius.

Figure 2:
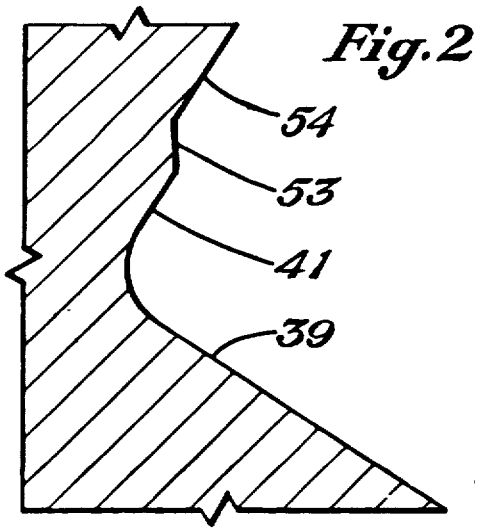
FIG. 2 is a fragmentary longitudinal section of a portion of the FIG. 1 embodiment, showing one region of a bearing shaft extended from the head.
Figure 4:
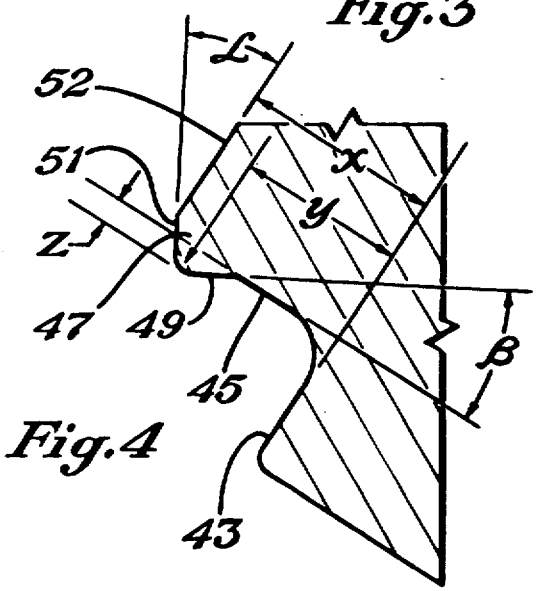
FIG. 4 is a fragmentary, longitudinal section of the recess area in the cone of the FIG. 1 embodiment.

As indicated best in FIG. 4, a shroud 47 extends a selected distance inwardly of the cylindrical seal surface 45 in the cutter 33 toward the cylindrical surface 39 (see FIG. 3) in the bearing shaft to bias the resilient packing ring, here an O-ring, 37 inwardly. Preferably, this shroud 47 extends inwardly not more than about 30 per cent of the cross-sectional thickness of the O-ring 37 in its relaxed condition before assembly on the bearing shaft 30. The O-ring 37 is preferably compressed between the cylindrical seal surfaces 39, 45 in a range of about 10 to 15 percent. As indicated in FIG. 3, the shroud 47 has an inward oblique surface 49 adapted to engage the O-ring 37 to bias it inwardly and away from radial seal surface 41. The shroud 47 also has an outward oblique surface 51 which opposes a parallel oblique surface 53 in the head, as indicated in FIG. 2. The cone backface 52 of FIG. 3 opposes the last machined surface 54 in the body of the bit.

The resilient O-ring 37, when compressed as indicated in FIG. 3, does not span the distance between radial seal surfaces 41, 43 of the head and cutter, but rather, has a length less the minimum length of the composite gland by distance "C". The composite recess should be approximately 30 percent greater in width than that of the O-ring when in its relaxed condition. The nominal squeeze of the O-ring is preferably 12 percent but in practice varies in a range from about 10 to 15 percent. Thus, the clearance C is sufficient to permit the O-ring 37 to move back and forth within the composite seal recess to compensate for pressure differences in the lubricant and minimize pressure pulses that otherwise may tend to push the O-ring outwardly in a manner to cause excessive heat, wear or extrusion.

With reference to FIG. 3, the preferred dimensions are as follows:

C=0.15D
X=1.4D
Y=1.2D
Z=0.15D
$\alpha = 30°$
$\beta = 30°$

Where:

C is the difference in the length of the compressed seal and the minimum length of the composite gland or distance between radial seal surfaces.

X is the distance from the cutter backface to the radial seal surface 43.

Y is the distance from the cutter backface 42 to the minimum diameter of the shroud.

Z is the distance the shroud extends inwardly from a cylindrical seal surface 45.

$\alpha$ and is the angle of the outward oblique surface.

$\beta$ is the angle of the inward oblique surface.

D is the cross-sectional thickness of the O-ring in its relaxed condition.

Bits constructed as indicated above have less wear than comparison bits of the metal forming the radial seal surface 41 in the head. This is the result of the shroud 47, which prevents the O-ring 37 from being urged forcefully against the radial seal surface 41 and the mating surface of the seal. Also, the configuration of the shroud tends to prevent abrasives from the drilling fluid from reaching the O-ring and seal surface 41.

While we have shown my invention in only one of its forms, is should be apparent to those skilled in the art that it is not thus limited, but is susceptible to various changes and modification.

I claim:

1. An improved earth boring bit comprising:
a body;
a pressure compensating lubrication system carried by the body;
a cantilevered bearing shaft extending from an outer region of the body;
a cylindrical seal surface and a radial seal surface carried by the body;
a cutter rotatably secured to the bearing shaft, with an annular seal recess having radial and cylindrical seal surfaces to oppose the seal surfaces carried by the body;
a resilient and annular packing ring compressed between the cylindrical seal surfaces, but having a compressed length a selected quantity less than the minimum length between the radial seal surfaces;
a shroud extending inwardly a selected distance to bias the packing ring away from the radial seal surface of the body.

2. The invention defined by claim 1 wherein the packing ring is of the o-ring type.

3. The invention defined by claim 2 Wherein the shroud extends inwardly not more than about 30 percent of the cross sectional thickness of the O-ring in its relaxed condition.

4. An improved earth boring bit comprising:
a body;
a pressure compensating lubrication system carried by the body;
at least one cantilevered, generally cylindrical bearing shaft extending downwardly and inwardly from an outer region of the body;
a radial seal surface on the body and an adjoining cylindrical seal surface on the bearing shaft;
a cutter rotatably secured to the bearing shaft, including an internal bearing cavity with an annular seal recess formed in an opening of the cavity to opposed the radial seal surface in the body and the cylindrical seal surface on the bearing shaft;
the annular seal recess in the cutter, opposed radial seal surface on the body and cylindrical seal surface on the bearing shaft forming an annular seal gland with inner and outer cylindrical seal surfaces and inner and outer radial seal surfaces;
a resilient and annular packing ring compressed between the cylindrical surfaces, but having a compressed length a selected quantity less than the minimum length between the radial seal surfaces;
a shroud extending inwardly from the cutter backface a selected distance from the cylindrical seal surface of the cutter with an oblique surface to bias the packing ring inwardly.

5. The invention defined by claim 4 wherein the packing ring is of the O-ring type.

6. The invention defined by claim 5 wherein the shroud extends inwardly not more than about 30 percent of the cross sectional thickness of the O-ring in its relaxed condition.

7. The invention defined by claim 5 wherein the O-ring type packing ring is compressed between the cylindrical surfaces in a range of about 10 to 15 percent.

* * * * *